Aug. 8, 1950      D. L. HILL      2,517,664
EDUCATIONAL DRAWING DEVICE
Filed June 28, 1949      2 Sheets-Sheet 1
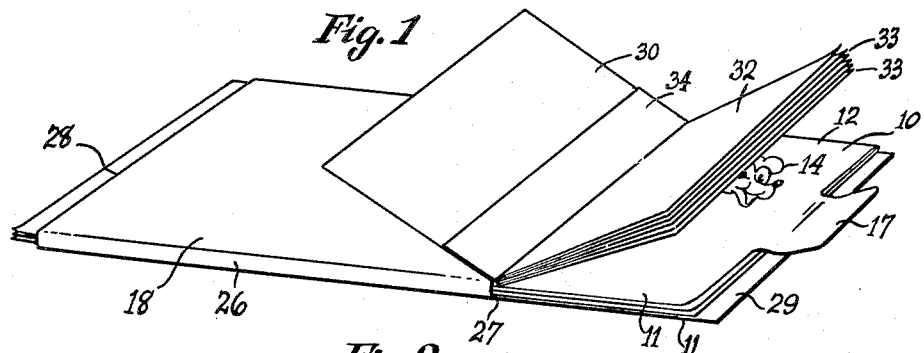
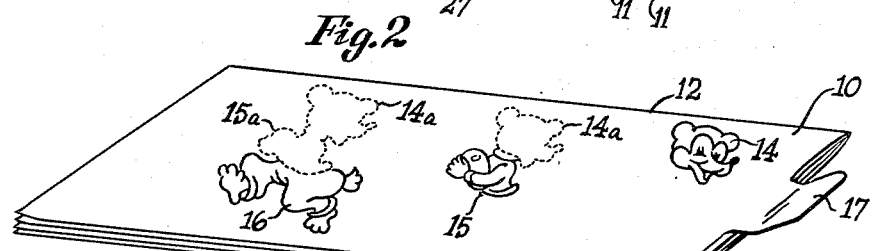
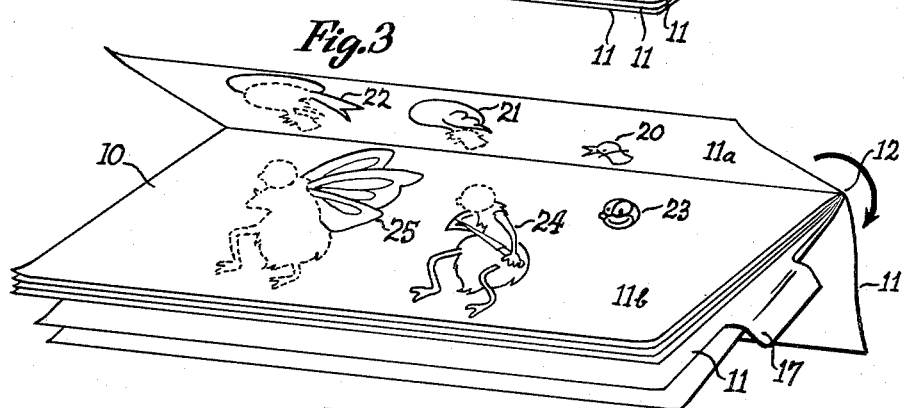
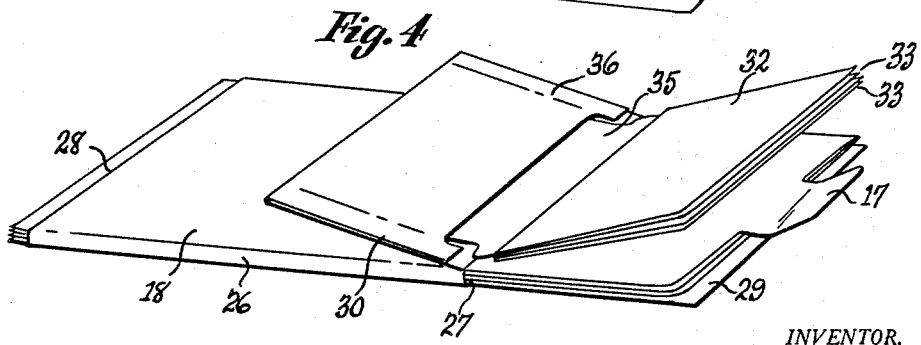
INVENTOR.
Dale Logan Hill
BY
Stedman B. Hoar
Agent

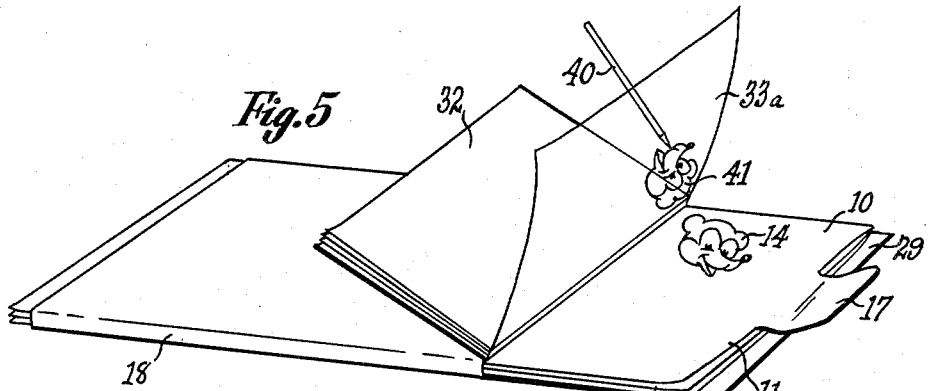
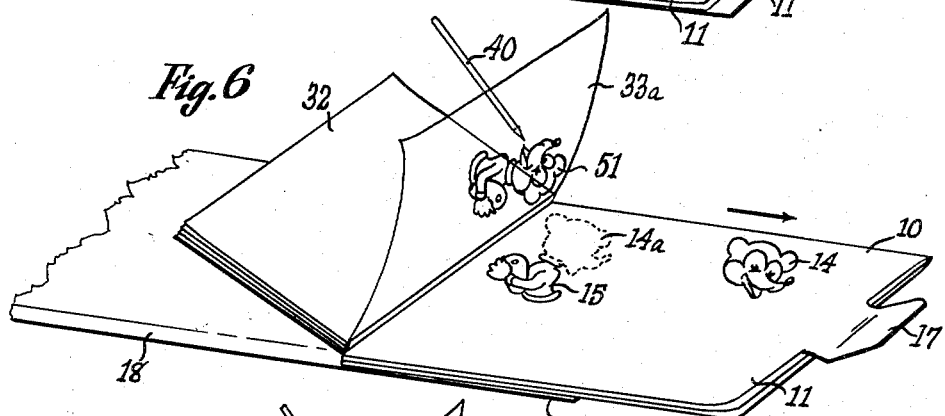
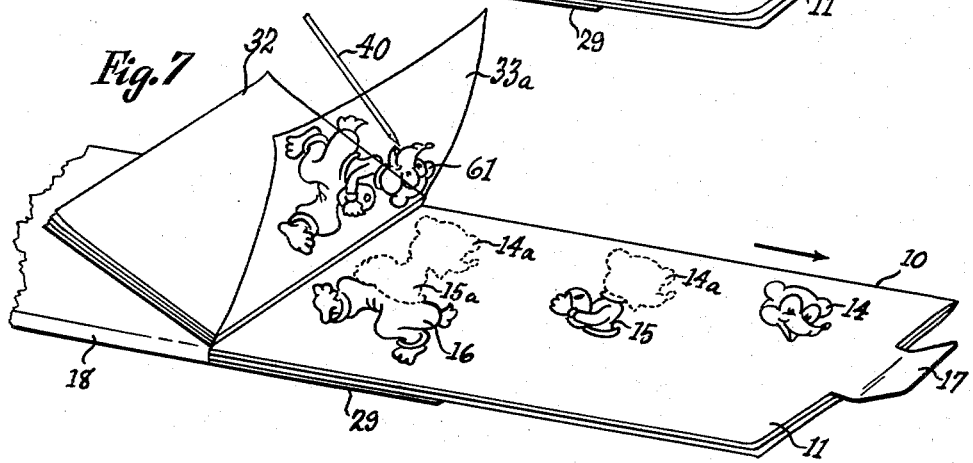

Patented Aug. 8, 1950

2,517,664

UNITED STATES PATENT OFFICE 2,517,664

EDUCATIONAL DRAWING DEVICE

Dale Logan Hill, Newport Beach, Calif.

Application June 28, 1949, Serial No. 101,699

7 Claims. (Cl. 35—28)

This invention relates to an educational drawing device and has particular reference to an improved form of drawing book or copy-book for the teaching of rudiments of the art of drawing and the development of manual skill in that art by means of pictures which the pupil traces.

Copy-books of the above-described nature are primarily intended for the instruction and enjoyment of children, who are often incapable of applying sustained attention to the drawings, even though the pictures which they copy are selected with a view to amusing qualities. It is recognized generally that good teaching technique not only requires simple first lessons, becoming progressively more difficult, but should give the pupil a sense of accomplishment. Yet complex drawings, which may produce emotions of pride and achievement in the child who has succeeded in tracing them, may produce initially only bewilderment and discouragement.

It is accordingly an object of my invention to provide a copy-book in which pictures of varying complexity are presented to the pupil in a series of comparatively simple fragments individually encouraging to the pupil as being within his capabilities to trace, these fragments appearing, when traced, as a unified picture from which a young pupil may derive both pride and amusement.

A further object of my invention is to provide a copy-book in which all of the fragmentary views of a complete picture may be arranged on a single subject sheet, or on two or more consecutive subject sheets if the number of fragments so warrants, so that the pupil may derive an understanding of the development of the series of fragments into a unified tracing, yet in which only the fragment being currently traced and fragments already traced are visible to the pupil while the tracing is in progress, so that the pupil's attention is not distracted and the magnitude of the task does not appear overwhelming.

Another object of the invention is to provide a copy book of the character indicated in which the subject sheets may carry fragmentary pictorial views on both sides, and are not torn out or destroyed but may be used in endless sequence and repetitively in conjunction with replaceable pads of tracing paper, thus prolonging the life of the book for use in instructing and amusing a number of children consecutively.

Other objects and advantages of my invention will be pointed out as the following description of a preferred embodiment of the invention proceeds, or will be apparent from consideration of that description and of the accompanying drawings illustrative thereof, in which:

Fig. 1 is a perspective view of a copy-book embodying the principles of my invention, showing the assemblage of a booklet of subject sheets, a pad of tracing sheets, and a cover or box for retaining the booklet and pad;

Fig. 2 is illustrative of a booklet of subject sheets, shown withdrawn from its cover;

Fig. 3 shows the same booklet as shown in Fig. 2, some of the sheets thereof having been turned or partly turned, to illustrate how the booklet may be used repetitively without destruction;

Fig. 4 shows a modification of the invention in which a replaceable pad of tracing paper is held in a flap of the copy-book cover;

And Figs. 5, 6 and 7 are views illustrating consecutive steps in tracing a picture from three fragmentary views.

Having reference now to the details of the drawings, I have illustrated in Figs. 2 and 3 a booklet 10 comprising a plurality of leaves 11 bound together at their margins 12 so that the leaves may be reversibly folded as indicated by the arrow in Fig. 3 and still lie in a flat folded condition. The binding may be of any suitable kind such as stitching, or wire loops, or thread or tape run through grommets, which will permit the booklet to be folded so that any of its pages may be exposed.

Upon the leaves 11, and preferably on both sides thereof, are representations or pictures which are divided into fragmental views, such as the views 14, 15, and 16 shown in Fig. 2. One of leaves 11 is preferably provided with a pull-tab 17 by which the booklet may be pulled from within a cover 18 so as to successively expose the views on the uppermost leaf of the booklet, as for example first exposing the picture part or view 14, as illustrated in Fig. 1. The next view 15, in succession in the order of appearance as the booklet is pulled from the cover 18 by the tab 17, will include indicia lines 14a preferably in light or broken lines and indicative of the outline or other identifiable feature of the preceding view 14. So also, the next succeeding view 16 will include indicia lines, which may be the indicia lines 14a and in addition thereto lines 15a indicative of identifiable features of the view 15. The number of view or picture parts on a page is limited only by convenience, but each succeeding view should include some indicia from at least one preceding view.

As previously stated, both sides of each leaf 11 are preferably used to portray fragmentary pictorial views, each page containing the parts of one whole picture. Thus, as shown in Fig. 3, the page 11a may portray pictorial parts 20, 21, and 22, and the opposite page 11b may portray parts 23, 24 and 25. Obviously, either page 11a or page 11b may be brought uppermost by folding back page 11a and turning the booklet over. There need, therefore, be no waste or blank pages in my booklet 10, such as occur in sundry other types of tracing books, and the pages and pictures thereon lie in endless sequence.

The cover 18 is in the form of a sleeve-like box 26, having an opening 27 at one end to receive the booklet 10, and closely fitting the booklet so as to hold the booklet square with the cover even when the booklet is largely withdrawn therefrom. The opposite end 28 of the cover may also be open, if desired, to permit insertion of the booklet from either end. One side 29 extends outwardly beyond the opening 27, and serves as a support for that portion of the booklet 10 which may have been withdrawn or left outstanding from the enclosed or box portion 26 of the cover. I term the area immediately above the extended side 29 a tracing area, in that it is the area to which the various picture parts are moved to be traced, and in which support for the booklet 10 and resistance to pressure of a pencil is provided by the side 29.

A flap 30 is attached to the margin of the opening 27 opposite to the extended side 29, so as to be foldable towards the box 26 or alternatively to lie in extension of the box and overlaying the extended side 29. When the flap 30 is folded towards the box 26, as shown in Figs. 1 and 4, it exposes the aforesaid tracing area. When it overlies the extended side 29, it forms therewith a cover for the part of the booklet 10 extending from the box 26. Ordinarily, the booklet 10 will be substantially equal in length to the box 26 and the side 29 and flap 30 extended.

Transparent tracing material which may be paper or cloth is provided in sizes suitable to overlay the tracing area and to receive a composite tracing of pictorial parts successively moved to that area. As shown in Fig. 1, this material may be provided in the form of a pad 32 of tracing sheets 33 having a flap 34 which is fastened, as by glueing, to the flap 30. Alternatively, as shown in Fig. 4, the pad 32 may be replaceable as a unit, being provided with a flap 35 which fits slidably under a binder sheet 36 marginally secured to the flap 30. In either case the pad 32 is bound only along its margin adjacent to its connection to the pad 30, and the sheets 33 may be individually posited to overlay the tracing area and may be separated from the pad when they have been used. It is important that the connection of the pad 32 to the cover 18 be sufficiently rigid to provide accurate positing of the individual sheets with respect to the tracing area, to provide accurate registering of succeeding pictorial parts with those already traced.

Tracing a unified picture with my improved copy-book is accomplished by a series of stages illustrated in Figs. 5, 6, and 7. It will be first observed that the views on each page of the booklet 10 are spaced with respect to one dimension of the page, that is, in the direction transverse to the sliding movement of the page, in the same relationship as they have in the picture of which they are parts; but that they are spaced further apart in the other dimension of the page or in the direction in which the page slides in and out of the cover 18.

As shown in Fig. 5, in the first stage of making a tracing, the booklet 10 is pushed into the cover 18 until the first fragmentary view to be traced, in this case the view 14, is suitably registered in the tracing area. This will normally require the booklet to be disposed substantially coextensively with the cover 18 and the extended side 29, and such a position may be assumed as providing a registration of the view 14 which will permit the unified picture to be traced on one sheet 33a of the tracing pad 32. A sheet 33a having been posited in register with the tracing area, the view 14 is traced thereon, as with a pencil 40, appearing as view 41. It will be understood that in Fig. 5, the view 41 and the pencil 40 are seen through the transparent sheet 33a, the view 41 consequently appearing reversed.

When the view 14 has been traced, the booklet 10 is partly withdrawn from the cover 18, as shown by the arrow in Fig. 6, by pulling on the tab 17, until the view 15 appears and the indicia lines 14a come into register with the traced view 41. As the cover 18 restricts the booklet 10 to movement on one axis, and as the pad 32 and sheet 33a are held in exact relationship to the tracing area, register of the indicia lines 14a with the traced view 41 is simply and easily achieved, calling for no great skill on the part of a young pupil. The view 15 is then traced, the combined views 14 and 15 appearing as view 51 on the sheet 33a.

The booklet 10 is moved through successive stages of withdrawal from the cover 18, until all of the fragmentary views on the uppermost sheet 11 have been traced, for example forming the composite unified picture shown at 61 in Fig. 7, indicia lines of previously traced views guiding the register of the tracing with the subject view at each stage.

It will be at once seen that the sheet 11 contains no complete picture such as the picture 61, the most complete view being view 16 in combination with indicia lines 14a and 15a. Although a child may get a general idea of the expected appearance of the composite tracing from study of the fragmentary views 14, 15, and 16, enough to excite his interest and amusement, he has no assurance that his idea is correct until he has finished the composite tracing, and his curiosity is thereby maintained. He is also not initially frightened by the task before him, as the most developed fragmentary view 16 is much simpler than the composite view 61.

The construction of my improved copy-book permits the substitution of new booklets 10 with an old cover 18 when one booklet has been finished, and the fact that the sheets 11 are not torn out or destroyed but are simply folded upon their binding permits owners of these copy-books to exchange booklets. Substantial savings may thus be effected when the books are used for school or kindergarten drawing lessons with replaceable tracing pads 32.

Obviously, my invention is subject to some modifications, hence I do not choose to be limited to the above-described examples, but rather to the scope of the appended claims.

I claim:

1. In a device of the character described: a booklet of subject leaves, each leaf having depicted thereon a plurality of parts of a picture so arranged that movement of said booklet bringing said parts successively to a common tracing area will permit a composite tracing of said parts to form a unified reproduction of said picture; a sleeve-like cover defining an exposed tracing area, said booklet being slidable in said cover to bring said parts successively to said tracing area; and transparent material receptive to delineation of a picture, secured to said cover so as to overlay said tracing area.

2. In a device of the character described: a booklet reversibly foldable to expose any of its pages while in a flat folded condition; pictures on the pages of said booklet divided into fragmentary views, the views on each page being spaced with respect to one dimension of the page in the same relationship as they would have if combined in a unified picture but being spaced further apart with respect to the other dimension of the page; a flat sleeve in which said booklet is slidable in the directions of said other dimension of said pages so as to conceal more or less of the views on the page of said booklet temporarily outermost; and a pad of transparent sheet material replaceably held by said sleeve so that a sheet of said material may be disposed above an exposed part of said booklet, whereby said views may be traced on said sheet to form a unified picture as said booklet is withdrawn from said sleeve in stages bringing successive views beneath said sheet.

3. In a device of the character described: a box-like cover having an opening at one end and a side extending beyond said opening to define a tracing area upon which material to be traced may be supported; transparent material, receptive to delineation of a picture, held by said cover so as to overlay said tracing area; a booklet of subject leaves slidable in and out of said open end of said cover to expose successive portions of said leaves upon said tracing area; pictures delineated on said leaves in fragmentary views adapted to form a composite picture when brought successively to said tracing area and there traced on said transparent material; said cover being adapted to guide said booklet to maintain said views in proper relationship with respect to one dimension of a tracing.

4. In a device of the character described: a box-like cover having an opening at one end and a slide extending beyond said opening to define a tracing area upon which material to be traced may be supported; transparent material, receptive to delineation of a picture, held by said cover so as to overlay said tracing area; a booklet of subject leaves slidable in and out of said open end of said cover to expose successive portions of said leaves upon said tracing area; pictures delineated on said leaves in fragmentary views adapted to form a composite picture when brought successively to said tracing area and there traced on said transparent material; said cover being adapted to guide said booklet to maintain said views in proper relationship with respect to one dimension of a tracing, and successive members of said views including indicia lines of preceding views for registration of said successive members with respect to the other dimension of a tracing.

5. In a device of the character described: a box-like cover having an opening at one end and a side extending beyond said opening to define a tracing area upon which material to be traced may be supported; transparent material, receptive to delineation of a picture, held by said cover so as to overlay said tracing area; a booklet of subject leaves slidable in and out of said open end of said cover to expose successive portions of said leaves upon said tracing area; pictures delineated on said leaves in fragmentary views adapted to form a composite picture when brought successively to said tracing area and there traced on said transparent material; said views including indicia lines of preceding views in the order in which said views are withdrawn from said cover, for registration of successive views with a tracing.

6. In a device of the character described: a booklet of subject leaves, each leaf having depicted thereon a plurality of parts of a picture so arranged as to form the subject of a composite tracing when moved successively and unidirectionally to a tracing area; a sleeve-like box, having an opening at one end guidingly receptive to said booklet, and a side extending beyond said opening and adapted to support portions of said booklet withdrawn from said box; a flap secured to said box marginally of said opening and adapted alternatively to overlay said extended side whereby said box forms a cover for said booklet, and to fold back upon said box to expose said extended side and/or portions of said booklet supported thereon, whereby the area so exposed forms a tracing area for tracing picture parts displayed therein; and transparent material, receptive to delineation of a picture, held marginally by said cover so as to be positable upon said tracing area.

7. In a device of the character described: a booklet of subject leaves, each leaf having depicted thereon a plurality of parts of a picture so arranged as to form the subject of a composite tracing when moved successively and unidirectionally to a tracing area; a sleeve-like box, having an opening at one end guidingly receptive to said booklet, and a side extending beyond said opening and adapted to support portions of said booklet withdrawn from said box; a flap secured to said box marginally of said opening and adapted alternatively to overlay said extended side whereby said box forms a cover for said booklet, and to fold back upon said box to expose said extended side and/or portions of said booklet supported thereon, whereby the area so exposed forms a tracing area for tracing picture parts displayed therein; and a pad of separable tracing sheets mounted on the inner side of said flap so as to permit individual sheets to be folded to an overlaying position on said tracing area.

DALE LOGAN HILL.

No references cited.